(12) United States Patent
White et al.

(10) Patent No.: US 8,127,907 B1
(45) Date of Patent: Mar. 6, 2012

(54) MARINE TRANSMISSION USING RHEOLOGICAL FLUIDS

(76) Inventors: Brian R. White, Stillwater, OK (US);
Keith S. Ducotey, Stillwater, OK (US);
Brian S. Ritthaler, Stillwater, OK (US)

( * ) Notice: Subject to any disclaimer, the term of this patent is extended or adjusted under 35 U.S.C. 154(b) by 568 days.

(21) Appl. No.: 12/364,866

(22) Filed: Feb. 3, 2009

(51) Int. Cl.
*B63H 20/20* (2006.01)
*F16D 47/06* (2006.01)
*F16D 37/02* (2006.01)
*F16D 35/00* (2006.01)

(52) U.S. Cl. .................. 192/21.5; 192/48.2; 192/48.5; 192/51; 192/57; 440/75

(58) Field of Classification Search .............. 192/48.5, 192/57
See application file for complete search history.

(56) References Cited

U.S. PATENT DOCUMENTS

| | | | | |
|---|---|---|---|---|
| 2,575,360 | A | * | 11/1951 | Rabinow .............. 192/21.5 |
| 2,886,151 | A | * | 5/1959 | Winslow .............. 192/21.5 |
| 4,444,298 | A | | 4/1984 | Stangroom |
| 4,664,236 | A | | 5/1987 | Stangroom |
| 4,820,210 | A | * | 4/1989 | Dretzka ............... 440/75 |
| 5,094,328 | A | | 3/1992 | Palmer |
| 5,779,013 | A | | 7/1998 | Bansbach |
| 5,915,513 | A | | 6/1999 | Isley, Jr. et al. |
| 5,988,336 | A | | 11/1999 | Wendt et al. |
| 6,062,360 | A | | 5/2000 | Shields |
| 6,102,827 | A | | 8/2000 | Teasdale et al. |
| 6,241,067 | B1 | | 6/2001 | Hock |
| 6,544,083 | B1 | | 4/2003 | Sawyer et al. |
| 6,635,189 | B2 | | 10/2003 | Suh et al. |
| 6,817,961 | B2 | | 11/2004 | Moore et al. |
| 6,960,107 | B1 | | 11/2005 | Schaub et al. |
| 6,966,805 | B1 | | 11/2005 | Caldwell |
| 7,214,111 | B1 | | 5/2007 | Phillips et al. |
| 7,291,048 | B1 | | 11/2007 | Phillips et al. |
| 7,297,036 | B1 | | 11/2007 | Weronke et al. |

OTHER PUBLICATIONS

Tanaka & Gofuku, Fundamental Study of Fluid Transfer Using Electrorheological Effect, Department of Systems Engineering, Okayama University, Japan, 2000, http://escholarship.lib.okayama-u.ac.jp/operations_research/25.

Roszkowski, Bogdan, Skoczynski, Marek, Testing Viscosity of MR Fluid in Magnetic Field, Measurement Science Review, vol. 8, Section 3, No. 3, 2008, pp. 58-60.

* cited by examiner

*Primary Examiner* — Richard M. Lorence
(74) *Attorney, Agent, or Firm* — William D. Lanyi

(57) ABSTRACT

A marine transmission provides first and second drive gears that have first and second driving surfaces in contact with first and second quantities of rheological fluid. First and second driven surfaces of a propeller shaft are also in contact with the rheological fluids within first and second cavities. Torque is transmitted between the drive gears and the propeller shaft through the increase in viscosity of the rheological fluid. A dog clutch can also be provided in order to lock the propeller shaft to the driving one of the first and second drive gears after the rheological fluid is used to spin up the propeller shaft to the appropriate speed.

20 Claims, 3 Drawing Sheets

MARINE TRANSMISSION USING RHEOLOGICAL FLUIDS

BACKGROUND OF THE INVENTION

1. Field of the Invention

The present invention generally relates to marine transmissions and, more particularly, to a type of marine transmission that uses electrorheological or magnetorheological fluids.

2. Background of the Invention

Many different types of marine transmissions are known to those skilled in the art. In addition, various types of electrorheological and magnetorheological materials have been used in devices that benefit from variable viscosity fluids. Magnetorheological and electrorheological fluids have been used in conjunction with clutches, mounts which provide a controlled variable stiffness, and other components which benefit from the use of fluids that can change viscosity in an advantageous way.

U.S. Pat. No. 4,444,298, which issued to Stangroom on Apr. 24, 1984, describes a viscous shear clutch. An electrorheological fluid is used as a transmission fluid between confronting, rotatable sets of clutch plates across which a potential difference can be applied so as to vary the viscous shear characteristic of the interjacent fluid. Differential arrangements of the clutch plates ensure cancellation of residual drag effects and the clutch can be electrically varied substantially from complete disengagement to solid engagement.

U.S. Pat. No. 4,664,236, which issued to Stangroom on May 12, 1987, describes an electrically controlled progressive, frictional, torque transmitting device. It comprises a rotary element, a proportion of the rotary power available from the rotary element, being used, under the control of a direct electrical signal, to determine the degree of engagement of a frictional device, and hence the torque transmitted or absorbed by the torque transmitting device, thereby avoiding the requirement for an additional power source to activate the frictional device whole.

U.S. Pat. No. 5,094,328, which issued to Palmer on Mar. 10, 1992, describes an electrorheological clutch apply system. Two sets of interleaved plates are disposed within a stationary housing. The first set of plates is fixed to the stationary housing. The second set of plates is fixed to a shaft rotatable relative to the housing. A piston is coaxially disposed against the plates at one end of the interleaved plates. A piston apply chamber is located in the stationary housing on the opposite side of the piston. The electrorheological fluid is circulated through the system by a pump, passing by the apply side of the piston, then between the plates, and then back to the pump. When there is a voltage potential between the plates, the flow between the plates is restricted and the pressure of the fluid on the piston builds, displacing the piston toward the plates. The plates are moved closer together by the piston. Contact between the plates is prevented by insulating elements mounted to alternate surfaces of the plates.

U.S. Pat. No. 5,779,013, which issued to Bansbach on Jul. 14, 1998, describes a torque transfer apparatus using magnetorheological fluids. The torque transfer device modulates the amount of torque which is transmitted from an input shaft to an output shaft. The torque transfer device includes a first plate connected to the input shaft. A second plate is connected to the output shaft and spaced from the first plate. A magnetorheological fluid is provided between the first and second plates.

U.S. Pat. No. 5,915,513, which issued to Isley et al. on Jun. 29, 1999, describes a clutch with magnetorheological operator for transfer cases and the like. A multiple disc clutch pack includes a pilot magnetorheological operator which controls operation of an associated ball ramp operator which, in turn, compresses a clutch pack to selectively transfer torque between the input member and an output member.

U.S. Pat. No. 5,988,336, which issued to Wendt et al. on Nov. 23, 1999, describes a clutch with electrorheological or magnetorheological liquid pushed through an electrode or magnetic gap by means of a surface acting as a piston. The device relates to a controllable clutch based on electrorheological or magnetorheological liquids, in which the transmission of force or the transmission of torque is achieved in that an electrorheological or magnetorheological liquid is pushed through an electrode gap or magnet gap of the clutch by means of a surface acting as a piston.

U.S. Pat. No. 6,062,360, which issued to Shields on May 16, 2000, discloses a synchronizer for a gear shift mechanism for a marine propulsion system. A synchronized gear shift mechanism is provided for a marine propulsion system. Using a hub and a sleeve that are axially movable relative to an output shaft but rotationally fixed to the shaft and to each other, the gear shift mechanism uses associated friction surfaces to bring the output shaft up to a speed that is in synchronism with the selected forward or reverse gear prior to mating associated gear tooth surfaces together to transfer torque from an input shaft to an output shaft.

U.S. Pat. No. 6,102,827, which issued to Teasdale et al. on Aug. 15, 2000, describes a clutch assembly with a planetary gear set. A clutch includes a stationary housing member, a rotating member supported for rotation with respect to the stationary housing member, and a planetary gear assembly operably interconnecting the rotating member to an output shaft. An actuating mechanism includes a magnetorheological fluid and a plurality of actuation coils. An electric current is supplied to create a magnetic flux. When a current is applied to the coils, the rotating member is placed in the engaged position and when there is no current in the coils, the rotating member is in the disengaged position.

U.S. Pat. No. 6,241,067, which issued to Wick on Jun. 5, 2001, describes a mechanical clutch. It has two elements which, for the purpose of positively engaging one another, are provided with opposed end toothings which are adapted to one another, the first element being rotatably mounted and axially supported, the second element also being rotatably mounted and axially supported, and further being axially blocked in a first position for the purpose of being nonrotatably engaged with the first element, and being axially movable into a position in which it is freely rotatably and disengaged from the first element, with a device for selectively axially blocking the second element. The clutch comprises a cavity system whose shape is variable and which is filled with a magnetorheological fluid.

U.S. Pat. No. 6,544,083, which issued to Sawyer et al. on Apr. 8, 2003, discloses a shift mechanism for a marine propulsion system. The mechanism is provided in which a cam structure comprises a protrusion that is shaped to extend into a channel formed in a cam follower structure. The cam follower structure can be provided with first and second channels that allow the protrusion of the cam to be extended into either which accommodates both port and starboard shifting mechanism.

U.S. Pat. No. 6,635,189, which issued to Suh et al. on Oct. 21, 2003, describes an electrorheological fluid comprising dried water soluble starch as a conductive particle. The electrorheological fluid comprising water soluble starch as conductive particles contains less than 5% water, by weight. The ER fluid comprises water soluble starch as a conductive particle which is dispersed in non-conductive media. It exhibits considerable electrorheological effect even though the amount of water contained in the fluid is reduced. Thus, it can be widely applicable to water sensitive damping devices and power devices such as a suspension system, a vibration damper or an engine mount, a brake, a clutch, and so forth. It is feasible for various fields such as an automatic and an aerospace industry.

U.S. Pat. No. 6,817,961, which issued to Moore et al. on Nov. 16, 2004, describes a magnetically responsive limited slip differential. It includes a case, a pair of pinion gears, a pair of side gears and an electrically operable coupling including a magnetically responsive fluid. The coupling selectively drivingly interconnects one of the side gears and the case. In one instance, it includes a rotor having a plurality of outwardly extending blades positioned in communication with a magnetorheological fluid.

U.S. Pat. No. 6,960,107, which issued to Schaub et al. on Nov. 1, 2005, discloses a marine transmission with a cone clutch used for direct transfer of torque. When in a forward gear position, torque is transmitted from an input shaft, or driving shaft, to an output shaft, or driven shaft, solely through the cone clutch. When in forward gear position, driving torque between the driving and driven shafts is not transmitted through any gear teeth. When in reverse gear position, torque is transmitted through an assembly of bevel gears.

U.S. Pat. No. 6,966,805, which issued to Caldwell on Nov. 22, 2005, discloses a marine transmission with synchronized engagement of a dog clutch. A marine transmission for connecting a driven shaft to a driving shaft is provided with first and second dog clutch members and first and second friction clutch members which are actuated, respectively, by first and second hydraulically actuated devices. Engagement of the friction clutch members with each other creates rotation of the driven shaft that approaches or equals the rotational speed of the driving shaft so that subsequent engagement of the first and second dog clutch members can be accomplished without significant relative rotational speed differences between the two dog clutch members.

U.S. Pat. No. 7,214,111, which issued to Phillips et al. on May 8, 2007, discloses a position sensor for a gear shift assist mechanism in a marine propulsion device. The shift mechanism is provided with a position identification device that incorporates one or more probes in association with one or more depressions that identify alignment between various positions on the piston and cylinder of the shift assist mechanism.

U.S. Pat. No. 7,291,048, which issued to Phillips et al. on Nov. 6, 2007, discloses an actuator device for a marine propulsion transmission. An actuator of a marine propulsion transmission is attached to a movable clutch member through the use of a coupler which comprises a generally spherical member formed as a portion of the actuator and a chuck device formed as part of the clutch member.

U.S. Pat. No. 7,297,036, which issued to Weronke et al. on Nov. 20, 2007, discloses a marine retention system for a marine propulsion device. In a marine transmission, trailing faces of each of a plurality of gear projections extending axially from a forward gear are provided with a rake angle. This rake angle of each trailing face cooperates with an associated surface of each of a plurality of clutch projections to retain a dog clutch in an axial position relative to the forward gear even during periods when a marine vessel is rapidly decelerating and, as a result, the dog clutch moves into driving relation with the forward gear.

In a paper titled "Fundamental Study of Fluid Transfer Using Electrorheological Effect", Tanaka and Gofuku describe a new type of pump that can feed electrorheological fluid by utilizing the change in physical properties of the fluid by the application of voltage.

In an article titled "Testing Viscosity of MR Fluid in Magnetic Field", by Roszkowski, Bogdan, Skoczynski, and Marek, in volume 8, Section 3, No. 3, 2008 of MEASUREMENT SCIENCE REVIEW, the properties of magnetorheological fluids are discussed along with methods for determining the coefficient of viscosity of MR fluids for different values of magnetic field.

The patents described above are hereby expressly incorporated by reference in the description of the present invention.

Marine transmissions can benefit from a system which allows a shifting of the transmission without having to engage a generally stationary component with a component which is rotating at a greater speed. When a propeller shaft is suddenly engaged in torque transmitting relation with a driveshaft of an engine, the instantaneous shock loads can be significant. This can cause noise and potentially reduce the life of components within the transmission. This shock load can be significantly exacerbated when a propeller, attached to the propeller shaft, exhibits significant inertia and is stationary when an associated dog clutch is engaged between the stationary propeller shaft and a rotating driveshaft. It would therefore be significantly beneficial if an efficient and compact transmission could provide a method for avoiding these shock loads during a shifting procedure between neutral and either forward or reverse gear positions.

SUMMARY OF THE INVENTION

A marine transmission made in accordance with a preferred embodiment of the present invention comprises a driveshaft connected in torque transmitting association with a crankshaft of an engine and supported for rotation about a driveshaft axis, a pinion gear attached to the driveshaft, a propeller shaft supported for rotation about a propeller shaft axis, a first drive gear supported for rotation about the propeller shaft axis, a first driving surface of the first drive gear, a first driven surface of the propeller shaft, a first quantity of rheological fluid disposed in contact with the first driving surface and with the first driven surface, and a first actuator configured to change the viscosity of the first quantity of rheological fluid to connect the first driving surface in torque transmitting association with the first driven surface.

In a particularly preferred embodiment of the present invention it further comprises a dog clutch supported for rotation about the propeller shaft axis in synchrony with the propeller shaft. The dog clutch is selectively movable into torque transmitting association between the first drive gear and the propeller shaft and into non-torque transmitting association with the first drive gear.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
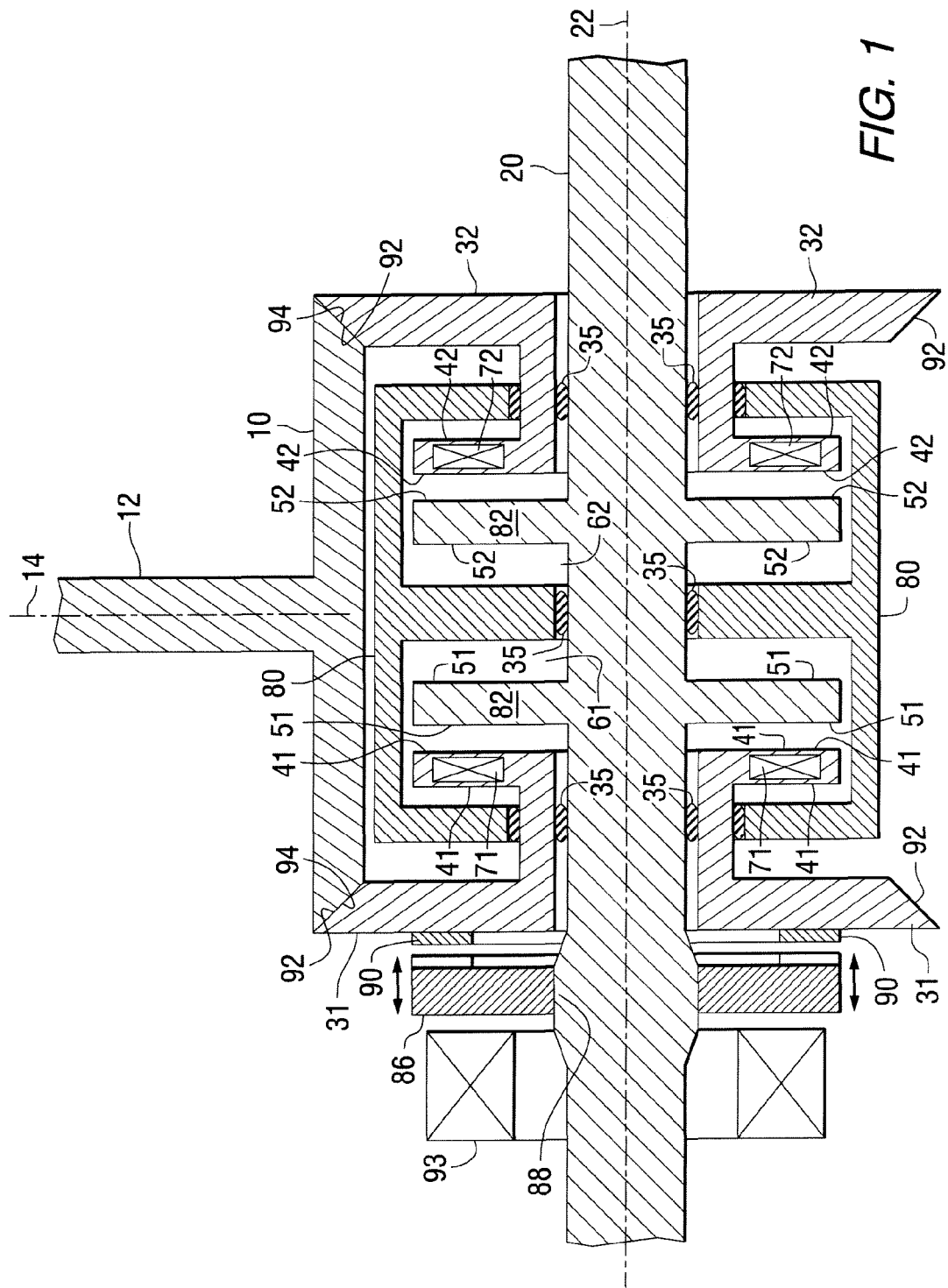
FIG. 1 shows a preferred embodiment of the present invention in which an intermediate member is used to enhance the surface area in contact with a rheological fluid.

Throughout the description of the preferred embodiment of the present invention, like components will be identified by like reference numerals.

FIG. 1 shows a preferred embodiment of the present invention. A pinion gear 10 is attached to a driveshaft 12 which is supported for rotation about a driveshaft axis 14. The driveshaft 12 is connected in torque transmitting association with a crankshaft of an engine (not shown in FIG. 1) in a manner that is well-known to those skilled in the art of marine propulsion systems. The marine transmission further comprises a propeller shaft 20 that is supported for rotation about a propeller shaft axis 22. A first drive gear 31 is supported for rotation about the propeller shaft axis 22. A first driving surface 41 of the first drive gear 31 and a first driven surface 51 of the propeller shaft 20 are arranged within a cavity 61 that contains a first quantity of rheological fluid. The first quantity of rheological fluid is disposed in contact with both the first driving surface 41 and the first driven surface 51. A first actuator 71 is schematically illustrated in a position where it can cause a change in viscosity of the rheological fluid. An intermediate rotatable member 80 is also illustrated in FIG. 1. In the particularly preferred embodiment shown in FIG. 1, the intermediate member 80 helps to transmit torque between the first drive gear 31 and the propeller shaft 20. It performs this valuable function by providing increased surface area on which the rheological fluid can act. When the viscosity of the rheological fluid, within the first cavity 61, is increased, it provides a torque transmitting connection between the first driving surface 41 and the first driven surface 51. The presence of the intermediate member 80 increases the overall surface area which is in contact with the rheological fluid. This increased contact area improves the transmission of torque between the first drive gear 31 and the propeller shaft 20. Surface conditioning or the provision of discontinuities can also facilitate this transmission of torque between the driving and driven surfaces.

With continued reference to FIG. 1, a second drive gear 32 is provided with a second driving surface 42. A second chamber 62 can be filled with a second quantity of rheological fluid so that a second driven surface 52 can be connected in torque transmitting association with the second driving surface 42 in a manner similar to that described above. The intermediate member 80 also serves to increase the surface area in contact with the rheological fluid. The seals 35 shown in FIG. 1 isolate the first and second cavities, 61 and 62, from other portions of the transmission which are typically filled with oil.

With continued reference to FIG. 1, rotation of the pinion gear 10 about the driveshaft axis 14 causes the first and second drive gears, 31 and 32, to rotate in opposite directions about the propeller shaft axis 22. Both the first and second drive gears, 31 and 32, are free to rotate relative to the propeller shaft 20 unless some mechanism is used to connect them to the propeller shaft. Energization of the rheological fluid is one method by which the first or second drive gears, 31 or 32, can be connected in torque transmitting relation with the propeller shaft 20. The first and second driven surfaces, 51 and 52, are provided by the annular plates 82. A dog clutch 86 is movable in an axial direction relative to the propeller shaft 20 and is connected for rotation with the propeller shaft by a plurality of splined teeth 88. This allows the dog clutch 86 to move axially, as illustrated by the arrows in FIG. 1, into or out of engagement with teeth 90 formed on the outer surface of the first drive gear 31. In the embodiment shown in FIG. 1, only the first drive gear 31 is engageable with the dog clutch 86. A solenoid device 93 can be used to magnetically urge the dog clutch 86 toward the right and into engagement with teeth 90 or toward the left and out of engagement with teeth 90. In a preferred embodiment of the present invention, an increase in the viscosity of the rheological fluid in either the first or second cavities, 61 or 62, can be used to cause the propeller shaft 20 to rotate with either the first or second drive gears, 31 or 32, respectively. With regard to the first drive gear 31, the rheological fluid can be used to begin the rotation of the propeller shaft 20 and increase its speed, from a stationary condition, so that engagement of the dog clutch 86 can be accomplished with less shock than would otherwise occur if the first drive gear 31 was connected to the propeller shaft 20 by the dog clutch 86 when the driveshaft 12 is rotating at normal speed and the propeller shaft 20 is stationary.

With continued reference to FIG. 1, it should be understood that a solenoid 93 and dog clutch 86 could be provided on the opposite axial side of the transmission in association with the second drive gear 32. However, in some applications of marine transmissions, space is limited and there isn't sufficient room for a second dog clutch structure.

Figure 2:
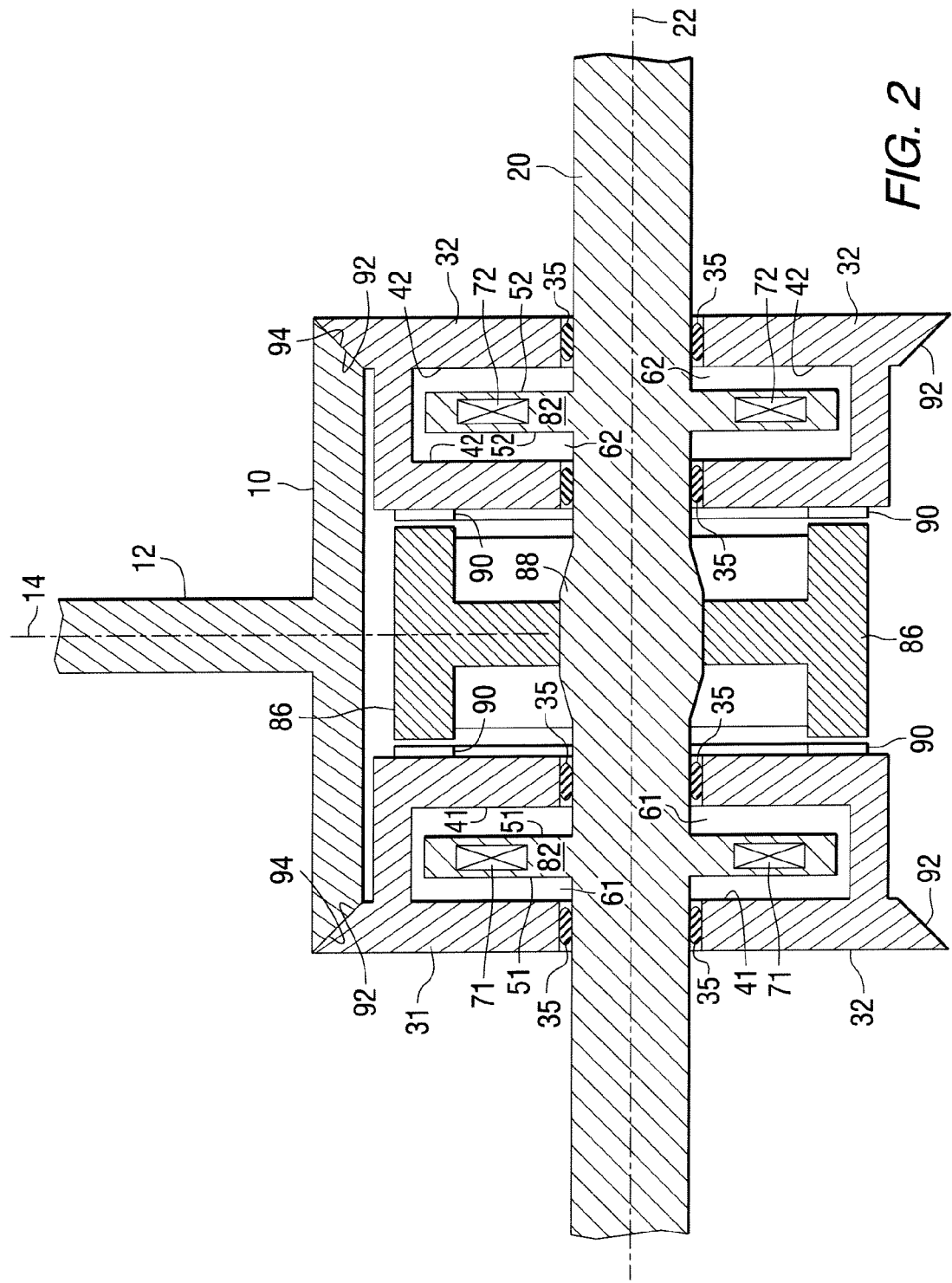
FIG. 2 places a dog clutch between first and second drive gears in an alternative embodiment of the present invention.

FIG. 2 shows an alternative embodiment of the present invention. Many of the components are similar to those described above in conjunction with FIG. 1, but in FIG. 2 some of those components are repositioned relative to others. For example, the intermediate member 80 shown in FIG. 1 is not used in the embodiment of FIG. 2. The dog clutch 86 is moved to a central position between the first drive gear 31 and the second drive gear 32. In addition, the shape of the first and second drive gears has been modified to allow the annular plate 82 of the driveshaft 20 to be moved between two legs of the drive gear. Actuation of the rheological fluid within the first or second cavities, 61 or 62, has the effect of connecting the first driving surface 41 in torque transmitting association with the first driven surface 51 or the second driving surface 42 in torque transmitting association with the second driven surface 52, respectively. The first and second actuators, 71 and 72, are located within the structure of the annular plates 82 as described above in conjunction with FIG. 2. The seals shown in FIG. 2 isolate the first and second cavities, 61 and 62, from the other regions of the transmission in which lubricating oil would typically be contained. In operation, one of the two quantities of rheological fluid would be energized by its associated actuator, 71 or 72, in order to connect the associated drive gear, 31 or 32, in torque transmitting association with the propeller shaft 20. In a preferred embodiment of the present invention, this procedure would be used to spin up the propeller shaft 20 to a speed that is close to the speed of the drive gear, 31 or 32, before the dog clutch 86 is moved into engagement with the teeth 90 of that drive gear.

With continued reference to FIGS. 1 and 2, it can be seen that the first and second driving surfaces, 41 and 42, and the first and second driven surfaces, 51 and 52, are generally perpendicular to the propeller shaft axis 22. That is not required in all embodiments of the present invention.

Figure 3:
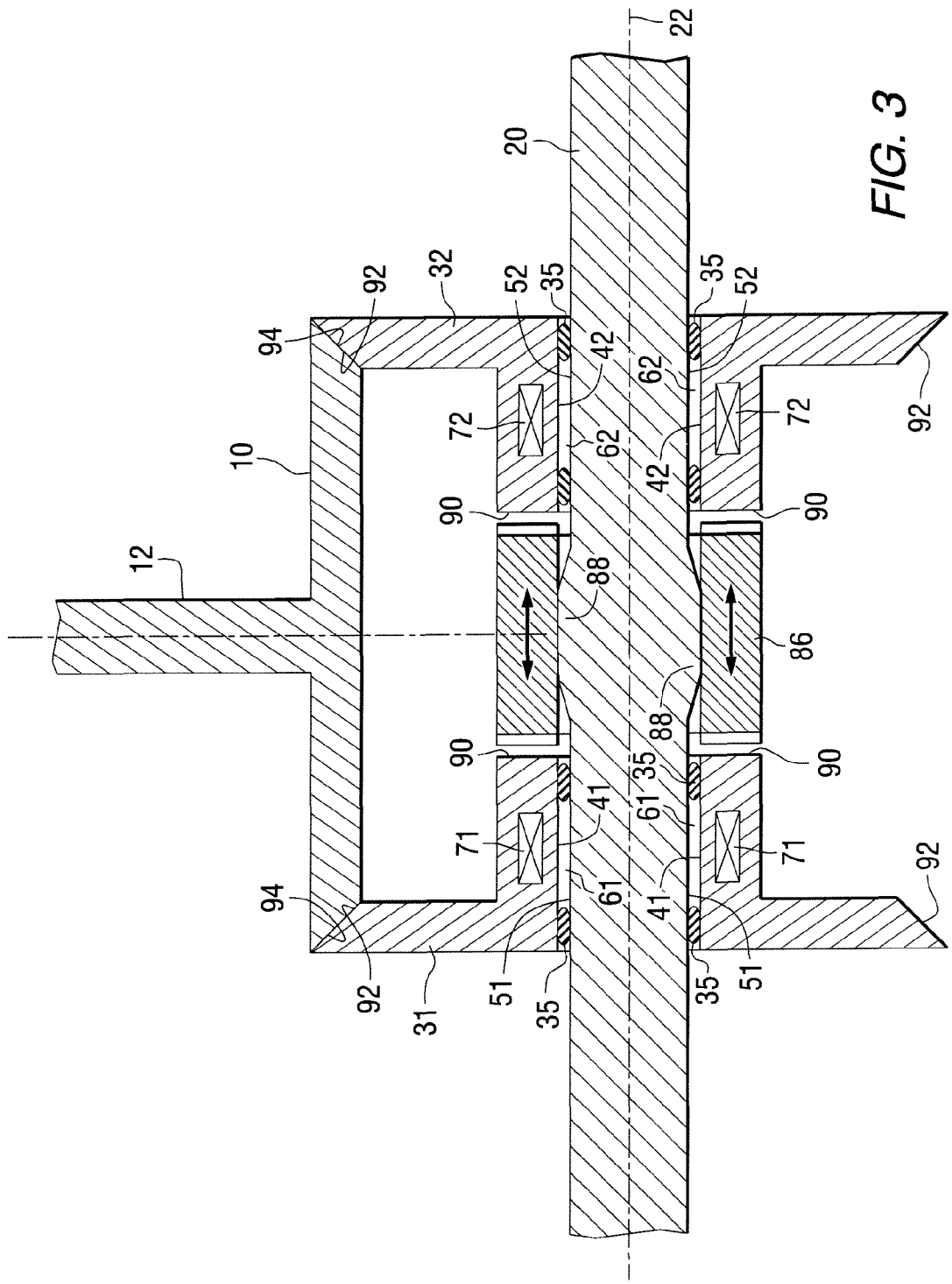
FIG. 3 shows an embodiment of the present invention in which the driving and driven surfaces are generally cylindrical.

FIG. 3 shows an alternative embodiment of the present invention in which the first and second driving surfaces, 41 and 42, and the first and second driven surfaces, 51 and 52, are not flat surfaces and are not generally perpendicular to the propeller shaft axis 22. Instead, they are the inner cylindrical surfaces of the first and second drive gears, 31 and 32, and the outer cylindrical surfaces of the propeller shaft 20. As described above, the dog clutch 86 is movable into engagement with teeth 90 formed on the axially inward surfaces of the first and second drive gears, 31 and 32. The first and second cavities, 61 and 62, are formed by the cooperation of the associated seals with the inner cylindrical surfaces of the first and second drive gears and the outer cylindrical surface of the propeller shaft 20. Splined teeth 88 are used to allow the dog clutch 86 to move axially relative to the propeller shaft 20 while also rotating in synchrony with it.

With continued reference to FIGS. 1-3, it can be seen that the alternative embodiments of the present invention utilize generally similar concepts and components with similar functions. However, they incorporate alternative arrangements and configurations of those components in order to achieve certain advantages relative to each other. In the embodiments described above, the first and second drive gears, 31 and 32, are bevel gears with teeth 92 that are disposed in meshing relation with teeth 94 of the pinion 10. For simplicity, the actual teeth are not shown in FIGS. 1-3, but those skilled in the art of marine transmissions are well aware of this type of arrangement in which a pinion gear 10 rotates with an attached driveshaft 12 while the first and second drive gears, 31 and 32, rotate in opposite directions to each other about the propeller shaft axis 22. Movement of the dog clutch 86 links either the first or second drive gears, 31 or 32, in torque transmitting association with the propeller shaft 20. Energization of the rheological fluid within either the first or second cavities, 61 or 62, also provides a torque transmitting connection between the first or second driving surfaces, 41 or 42, with the first or second driven surface, 51 or 52, respectively. In certain embodiments of the present invention, this transmission of torque from the driveshaft 12 to the propeller shaft 20 can be accomplished without engagement of the dog clutch 86. In other embodiments, the increase in viscosity of the rheological fluid is only used to spin up the propeller shaft 20 to a speed that approximates the speed of the relevant drive gear, 31 or 32, in order to reduce the shock load and associated noise when the dog clutch 86 is engaged with that drive gear.

With continued reference to FIGS. 1-3 and the patents described above, the behavior and methods for activation of rheological fluids are described in U.S. Pat. Nos. 4,444,298, and 4,644,236 which are identified above. The use of rheological fluids in clutch systems is described in U.S. Pat. Nos. 5,094,328 and 5,915,513. Other clutches that are controlled through the use of rheological fluids are described in U.S. Pat. No. 5,988,336, and 6,241,067. The actuation of dog clutches in marine transmissions is described throughout U.S. Pat. Nos. 6,544,083 and 7,214,111. The relationship between teeth of a dog clutch and the teeth of drive gears is described in detail in U.S. Pat. No. 7,291,048. All of these patents, and others, are identified and described above in the discussion of the background of the present invention. In addition, the characteristics of both electrorheological and magnetorheological fluids are described in the papers identified above.

With continued reference to FIGS. 1-3, preferred embodiments of the present invention comprise a pinion gear 10, a propeller shaft 20 supported for rotation about a propeller shaft axis 22, a first drive gear 31 supported for rotation about the propeller shaft axis 22, a second drive gear 32 supported for rotation about the propeller shaft axis 22, a first driving surface 41 of the first drive gear 31, a second driving surface 42 of the second drive gear 32, a first driven surface 51 of the propeller shaft 20, a second driven surface 52 of the propeller shaft 20, a first quantity of rheological fluid disposed in contact with the first driving surface 41 and with the first driven surface 51, a second quantity of rheological fluid disposed in contact with the second driving surface 42 and with the second driven surface 52, a first actuator 71 configured to change the viscosity of the first quantity of rheological fluid to connect the first driving surface 41 in torque transmitting association with the first driven surface 51, and a second actuator 72 configured to change the viscosity of the second quantity of rheological fluid to connect the second driving surface 42 in torque transmitting association with the second driven surface 52. In a preferred embodiment of the present invention the marine transmission further comprises a dog clutch 86 supported for rotation about the propeller shaft axis 22 in synchrony with the propeller shaft 20, wherein the dog clutch 86 is selectively movable into torque transmitting association between the first drive gear 31 and the propeller shaft 20 and into non-torque transmitting association with the first drive gear 31. As described above the dog clutch 86 in certain embodiments of the present invention is also selectively movable into torque transmitting association between the second drive gear 32 and the propeller shaft 20 and into non-torque transmitting association with the second drive gear 32. The first drive gear 31 in a preferred embodiment of the present invention is a forward drive gear and the second drive gear 32 is a reverse drive gear. The first and second drive gears are disposed in gear tooth meshing relation with the pinion gear and are configured to rotate in opposite directions about the propeller shaft axis 22. The first quantity of rheological fluid contained in the first cavity 61 can comprise either a magnetorheological liquid or an electrorheological liquid. Similarly, a second quantity of rheological fluid contained within the second cavity 62 can be either a magnetorheological liquid or an electrorheological liquid. In certain embodiments of the present invention, the first driving surface 41 of the first drive gear 31 is generally perpendicular to the propeller shaft axis 22 and the first driven surface 51 of the propeller shaft 20 is generally perpendicular to the propeller shaft axis 22. However, in alternative embodiments of the present invention, the first driving surface 41 of the first drive gear 31 and the first driven surface 51 of the propeller shaft 20 are both cylindrical and coaxial with the propeller shaft axis 22. Similarly, the second driving surface 42 and the second driven surface 52 can be cylindrical surfaces of the second drive gear 32 and the propeller shaft 20 in certain embodiments of the present invention.

Although not described in detail above, it should be understood that the driving surfaces and driven surfaces of the present invention can benefit in certain applications from perturbations formed in those surfaces. These perturbations, or irregularities, can be used to increase the driving effect between the rheological fluid and the contacting surfaces.

Although the present invention has been described in particular detail and illustrated to show several alternative embodiments, it should be understood that alternative embodiments are also within its scope.

We claim:

1. A marine transmission, comprising:
    a drive shaft supported for rotation about a drive shaft axis;
    a pinion gear attached to said drive shaft;
    a propeller shaft supported for rotation about a propeller shaft axis;
    a first drive gear supported for rotation about said propeller shaft axis;
    a first driving surface of said first drive gear;
    a first driven surface of said propeller shaft;
    a first quantity of rheological fluid disposed in contact with said first driving surface and with said first driven surface; and
    a first actuator configured to change the viscosity of said first quantity of rheological fluid to connect said first driving surface in torque transmitting association with said first driven surface.

2. The marine transmission of claim 1, further comprising:
a second driven surface of said propeller shaft;
a second drive gear supported for rotation about said propeller shaft axis;
a second driving surface of said second drive gear;
a second quantity of rheological fluid disposed in contact with said second driving surface and with said driven surface; and
a second actuator configured to change the viscosity of said second quantity of rheological fluid to connect said second driving surface in torque transmitting association with said second driven surface.

3. The marine transmission of claim 2, wherein:
said first drive gear is a forward drive gear and said second drive gear is a reverse drive gear, said first and second drive gears being disposed in gear tooth meshing relation with said pinion gear.

4. The marine transmission of claim 3, wherein:
said first and second drive gears are configured to rotate in opposite directions about said propeller shaft axis.

5. The marine transmission of claim 1, further comprising:
a dog clutch supported for rotation about said propeller shaft axis in synchrony with said propeller shaft, said dog clutch being selectively movable into torque transmitting association between said first drive gear and said propeller shaft and into non torque transmitting association with said first drive gear.

6. The marine transmission of claim 1, wherein:
said first quantity of rheological fluid comprises a magnetorheological liquid.

7. The marine transmission of claim 1, wherein:
said first driving surface of said first drive gear is generally perpendicular to said propeller shaft axis.

8. The marine transmission of claim 1, wherein:
said first driven surface of said propeller shaft is generally perpendicular to said propeller shaft axis.

9. The marine transmission of claim 1, wherein:
said first driving surface of said first drive gear and said first driven surface of said propeller shaft are both generally cylindrical and coaxial with said propeller shaft axis.

10. A marine transmission, comprising:
a pinion gear;
a propeller shaft supported for rotation about a propeller shaft axis;
a first drive gear supported for rotation about said propeller shaft axis;
a second drive gear supported for rotation about said propeller shaft axis;
a first driving surface of said first drive gear;
a second driving surface of said second drive gear;
a first driven surface of said propeller shaft;
a second driven surface of said propeller shaft;
a first quantity of rheological fluid disposed in contact with said first driving surface and with said first driven surface;
a second quantity of rheological fluid disposed in contact with said second driving surface and with said driven surface;
a first actuator configured to change the viscosity of said first quantity of rheological fluid to connect said first driving surface in torque transmitting association with said first driven surface; and
a second actuator configured to change the viscosity of said second quantity of rheological fluid to connect said second driving surface in torque transmitting association with said second driven surface.

11. The marine transmission of claim 10, further comprising:
a dog clutch supported for rotation about said propeller shaft axis in synchrony with said propeller shaft, said dog clutch being selectively movable into torque transmitting association between said first drive gear and said propeller shaft and into non torque transmitting association with said first drive gear.

12. The marine transmission of claim 11, wherein:
said first drive gear is a forward drive gear and said second drive gear is a reverse drive gear, said first and second drive gears being disposed in gear tooth meshing relation with said pinion gear, said first and second drive gears being configured to rotate in opposite directions about said propeller shaft axis.

13. The marine transmission of claim 10, wherein;
said first quantity of rheological fluid comprises a magnetorheological liquid.

14. The marine transmission of claim 10, wherein:
said first driving surface of said first drive gear is generally perpendicular to said propeller shaft axis; and
said first driven surface of said propeller shaft is generally perpendicular to said propeller shaft axis.

15. The marine transmission of claim 10, wherein:
said first driving surface of said first drive gear and said first driven surface of said propeller shaft are both generally cylindrical and coaxial with said propeller shaft axis.

16. A marine transmission, comprising:
a drive shaft supported for rotation about a drive shaft axis;
a pinion gear attached to said drive shaft;
a propeller shaft supported for rotation about a propeller shaft axis;
a first drive gear supported for rotation about said propeller shaft axis;
a first driving surface of said first drive gear;
a first driven surface of said propeller shaft;
a first quantity of magnetorheological fluid disposed in contact with said first driving surface and with said first driven surface;
a first actuator configured to change the viscosity of said first quantity of magnetorheological fluid to connect said first driving surface in torque transmitting association with said first driven surface; and
a dog clutch supported for rotation about said propeller shaft axis in synchrony with said propeller shaft, said dog clutch being selectively movable into torque transmitting association between said first drive gear and said propeller shaft and into non torque transmitting association with said first drive gear.

17. The marine transmission of claim 16, further comprising:
a second driven surface of said propeller shaft;
a second drive gear supported for rotation about said propeller shaft axis;
a second driving surface of said second drive gear;
a second quantity of rheological fluid disposed in contact with said second driving surface and with said driven surface; and
a second actuator configured to change the viscosity of said second quantity of rheological fluid to connect said second driving surface in torque transmitting association with said second driven surface.

18. The marine transmission of claim 17, wherein:
said first drive gear is a forward drive gear and said second drive gear is a reverse drive gear, said first and second drive gears being disposed in gear tooth meshing relation with said pinion gear.

19. The marine transmission of claim 16, wherein:

said first driving surface of said first drive gear is generally perpendicular to said propeller shaft axis; and said first driven surface of said propeller shaft is generally perpendicular to said propeller shaft axis.

20. The marine transmission of claim 16, wherein:

said first driving surface of said first drive gear and said first driven surface of said propeller shaft are both generally cylindrical and coaxial with said propeller shaft axis.

* * * * *

UNITED STATES PATENT AND TRADEMARK OFFICE
CERTIFICATE OF CORRECTION

PATENT NO. : 8,127,907 B1
APPLICATION NO. : 12/364866
DATED : March 6, 2012
INVENTOR(S) : White et al.

It is certified that error appears in the above-identified patent and that said Letters Patent is hereby corrected as shown below:

Title Page, Insert --[73] Assignee: Brunswick Corporation, Lake Forest, IL (US)--

Signed and Sealed this
Nineteenth Day of March, 2013

Teresa Stanek Rea
*Acting Director of the United States Patent and Trademark Office*